Figure 1:
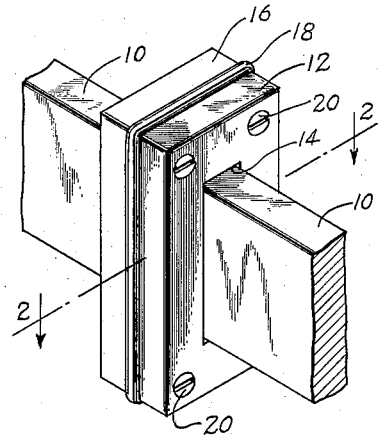

July 4, 1961

J. W. CHIVILLE 2,991,105

FITTING

Filed Oct. 16, 1956

2 Sheets-Sheet 1

INVENTOR.
John W. Chiville
BY
Donald P. Smith
Attorney

July 4, 1961 J. W. CHIVILLE 2,991,105
FITTING
Filed Oct. 16, 1956 2 Sheets-Sheet 2

INVENTOR.
John W. Chiville
BY
Donald P. Smith
Attorney

United States Patent Office 2,991,105
Patented July 4, 1961

2,991,105
FITTING
John W. Chiville, East Riverdale, Md., assignor to ACF Industries, Incorporated, New York, N.Y., a corporation of New Jersey
Filed Oct. 16, 1956, Ser. No. 616,278
2 Claims. (Cl. 287—108)

This invention relates generally to a structure for joining together a pair of longitudinally aligned members and is more specifically adapted to connect together tubular fittings or pipes such as wave guides. It is a well known practice in the prior art to connect abutting ends of longitudinally aligned members by integrally formed flanges on the several ends; a gasket may be inserted between the flanges to produce a pressure seal and to prevent metal to metal contact. This method, however, requires that the flanges be formed at the ends of the members, which is frequently difficult if not impossible to do when the members are formed at a distance from the point of installation thereof and careful measurements are necessary to provide a proper fit.

It is accordingly a broad object of this invention to provide a quickly mountable organization for coupling together members to be joined.

A further object of the invention is to provide an organization for coupling sections of tubular members and to seal the junction of the members.

Another object of the invention is to provide a combination connector, pressure seal, and supporting structure for securing together the ends of a pair of longitudinal sections.

The invention is especially useful in the application of wave guide structure in that the ends of the wave guides are brought together in substantially touching spacing and the fitting structure is slidably movable upon the wave guide until it is in final place and thoroughly tightened.

Summarily stated, the invention consists of an apparatus for connecting together a pair of longitudinally aligned members and comprises two elements, each surrounding a respective one of the members and a pad of material having yielding characteristics surrounding both members at the line of junction and disposed between the elements. A fastening means is provided to urge the pair of elements one toward the other to thereby compress the pad between the members whereby any opening left between the members is effectively sealed up by the flow of the material into the crevice and the material further distorts against both of the members to effectively hold them together. Optionally, flanges may be formed on either or both of the elements to provide structure whereby to mount the apparatus and support the members on a wall, or the like. The invention utilizes the principle that when force is applied in a direction normal to the surface of a confined yielding material, such material will expand against the confining surfaces and flow into any interstices. The frictional forces between the material and the surface of the held members acts to hold the work together and the fitting in place.

In accomplishing the purposes and the above-named objects of the invention an important feature is the fact that the joining elements are held spaced apart and in a plane parallel to each other and that the securing means reduces this spaced relation to contort the yielding material.

Figure 3:
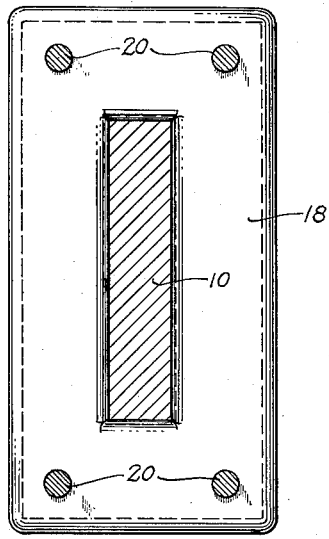
Figure 2:
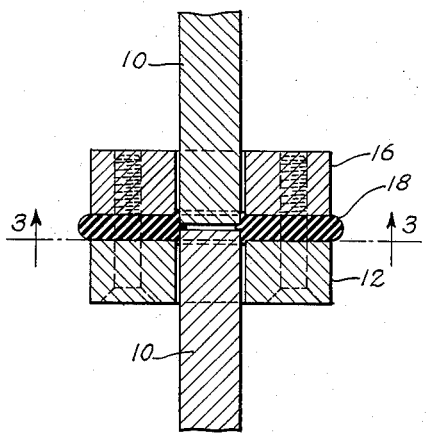
Figure 4:
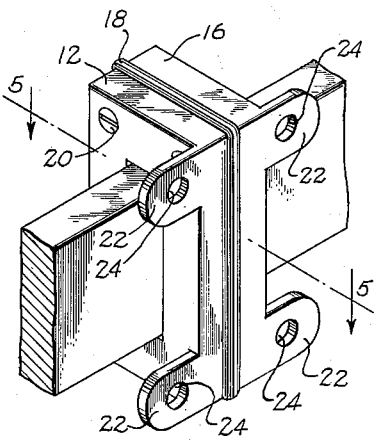
Figure 5:
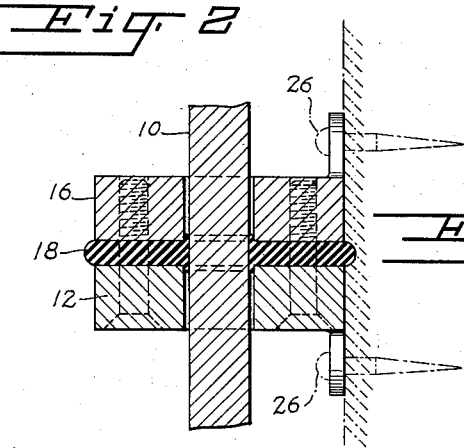
Figure 6:
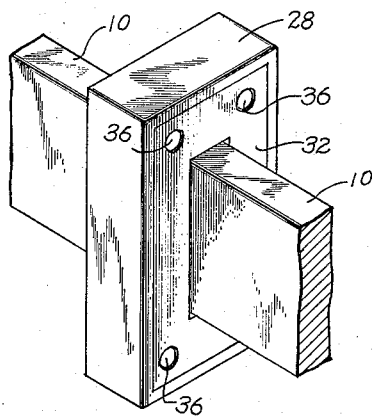
Figure 7:
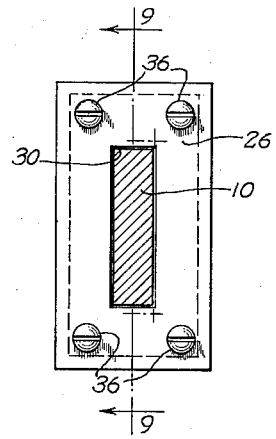
Figures 8, 9:
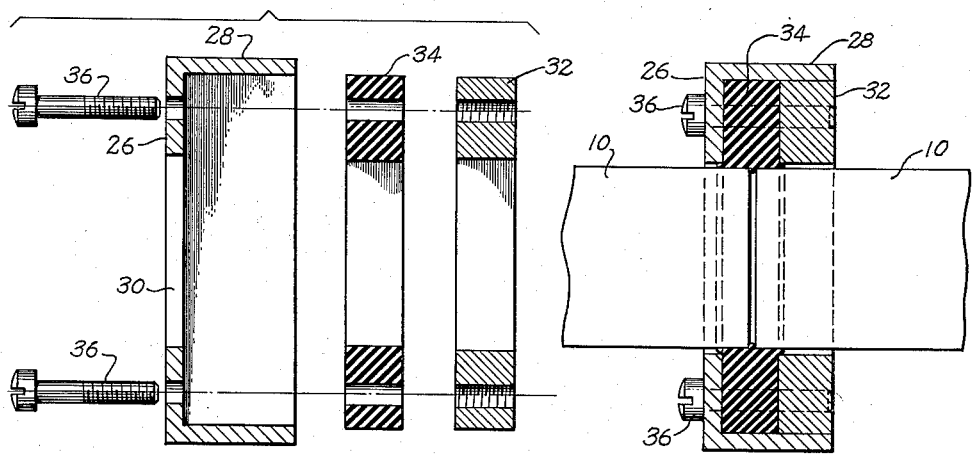

Further features and objects of the invention will be apparent from the following detailed description and accompanying drawings in which:

FIGURE 1 is a perspective view of the adjustable fitting.
FIGURE 2 is a sectional view taken on line 2—2 of FIGURE 1 and looking in the direction of the arrows.
FIGURE 3 is a longitudinal section taken on line 3—3 of FIGURE 2 and looking in the direction of the arrows.
FIGURE 4 is a perspective view of another embodiment of the invention.
FIGURE 5 is a sectional view taken on line 5—5 of FIGURE 4 and looking in the direction of the arrows.
FIGURE 6 is a perspective view of a further embodiment of the invention.
FIGURE 7 is an end elevation view of the embodiment shown in FIGURE 6.
FIGURE 8 is an exploded view of the embodiment of FIGURE 6.
FIGURE 9 is a sectional view taken on line 9—9 of FIGURE 7 and looking in the direction of the arrows.

Referring now to the drawings wherein like or similar parts are designated by like reference characters, 10 indicates a pair of longitudinal members disposed in longitudinally aligned relation and having the ends abutting and slightly spaced one from another as is seen in FIGURE 2. A first element 12 formed of metal is slidably arranged on member 10 and has formed therein an aperture 14 to receive the member. An identical element 16 having a member receiving aperture embraces the other of the longitudinal members 10 to lie in substantially parallel face-to-face relationship with the first element. A pad 18 of a material having resilient characteristics is placed in sandwiched relation between the two elements as is best seen in the section view of FIGURE 2. A series of aligned ports are formed in each respective corner of element 12 and 16 and threads are formed to receive bolts 20.

In operation the pair of longitudinally aligned members 10 are brought together in substantially abutting end relationship, each with an element 12 or 16 embracing the same; and pad 18 is placed between the elements and on the line of intersection of the members. When the bolts 20 are inserted and tightened, the spacing between parallel members 12 and 16 is reduced thereby distorting the resilient pad beyond the edges of the members, as is seen in FIGURE 2, and into the spacing between members. Portions of the pad are forced against the outer surfaces of the member ends and the friction force set up therebetween securely holds the members together. Since the resilient pad will flow into all interstices under the urging of the compression force it will effectively seal any openings which may exist between the members. If members 10 may be considered to be wave guides then an effective combination joining and sealing organization is provided at any point deemed necessary or desirable.

FIGURES 4 and 5 taken together illustrate the same general construction revealed in FIGURES 1, 2 and 3 except that flanges 22 are provided and formed at right angles to the planes of the respective elements and are fashioned with cavities 24 to receive screws 26 substantially as is shown in FIGURE 5. This embodiment illustrates the use of the joining apparatus as a supporting structure against a bearing wall or surface.

Referring now to FIGURES 6 to 9 inclusive, a further embodiment of the connecting structure is there illustrated. As shown, a first element 26 having a rim 28 to thereby form a substantially cup-shaped element has an aperture 30 formed therein whereby it is slidably received on a member 10. Element 32 is formed to be of such cross-sectional area as to be received in nesting relation within element 26. A pad 34 of material having yielding or resilient characteristics is disposed between elements 26 and 32 and is assembled therein as will be seen in FIGURE 9. Bolts 36 are provided to pierce element 26 and threadedly engage within chambers formed in element 32 whereby upon assembling the several elements one on each side of pad 34 and positioning such assembly over the line of intersection between two separated members, turning bolts 36 into their cavities will urge the elements toward each other and distort the resilient pad into any openings existing between the member ends. As previously indicated the application of a force against the face of a resilient pad causes distortion normal to the application when the pad is restrained as is the case here. The rim 28 prevents flow of the pad beyond the periphery of element 26 and forces the material to press tightly against the ends of members 10 thereby forming a firm connection.

The yielding material may be rubber or cork or any polymer which has resiliency and will flow when a compressive force is applied thereto. If a more permanent connection is desired a fitting containing a raw rubber pad may be used. Furnace curing may then be utilized on the connector to bond the material to the object to be joined. Obviously, by increasing the number of alternate elements and resilient pads any desired total joining friction may be obtained.

It will be understood that the assembly is not necessarily limited to use in joining together the ends of members but may be used on a continuous piece to act as an adjustable support member, as in FIGURE 4.

While the invention is here illustrated and described with respect to certain preferred embodiments thereof many changes may be made without departing from the generic spirit and scope of the invention as set forth herein and in the claims appended hereto.

I claim:

1. In a coupling structure, a pair of axially aligned members of identical and constant cross section along their periphery initially arranged in end to end abutting relationship, coupling collars slidably mounted on their respective members, a resilient element snugly encircling said members at their juncture and engaged between said collars, and means to move said collars toward each other to compress said resilient element between said collars and said axially aligned members for clamping said members in alignment.

2. In a coupling structure, a pair of axially aligned members of identical cross section along their periphery initially arranged in end to end abutting relationship, coupling collars slidably mounted on their respective members, a resilient element snugly encircling said members at their juncture and engaged between said collars, and means including bolts to move said collars toward each other to compress said resilient element therebetween whereby the inner peripheral portion of said element flows first between said collars and their respective members to urge the latter apart and thereafter flows into the space between said members.

References Cited in the file of this patent

UNITED STATES PATENTS

| Number | Name | Date |
|---|---|---|
| 212,257 | Norris | Feb. 11, 1879 |
| 442,947 | Bowers | Dec. 16, 1890 |
| 782,174 | Petersen | Feb. 7, 1905 |
| 960,792 | Bettigole | June 7, 1910 |
| 1,654,680 | Curtis | Jan. 3, 1928 |
| 1,783,410 | Coswell | Dec. 2, 1930 |
| 2,153,664 | Freelander | Apr. 11, 1939 |
| 2,315,134 | Roach et al. | Mar. 30, 1943 |